Figure 7:
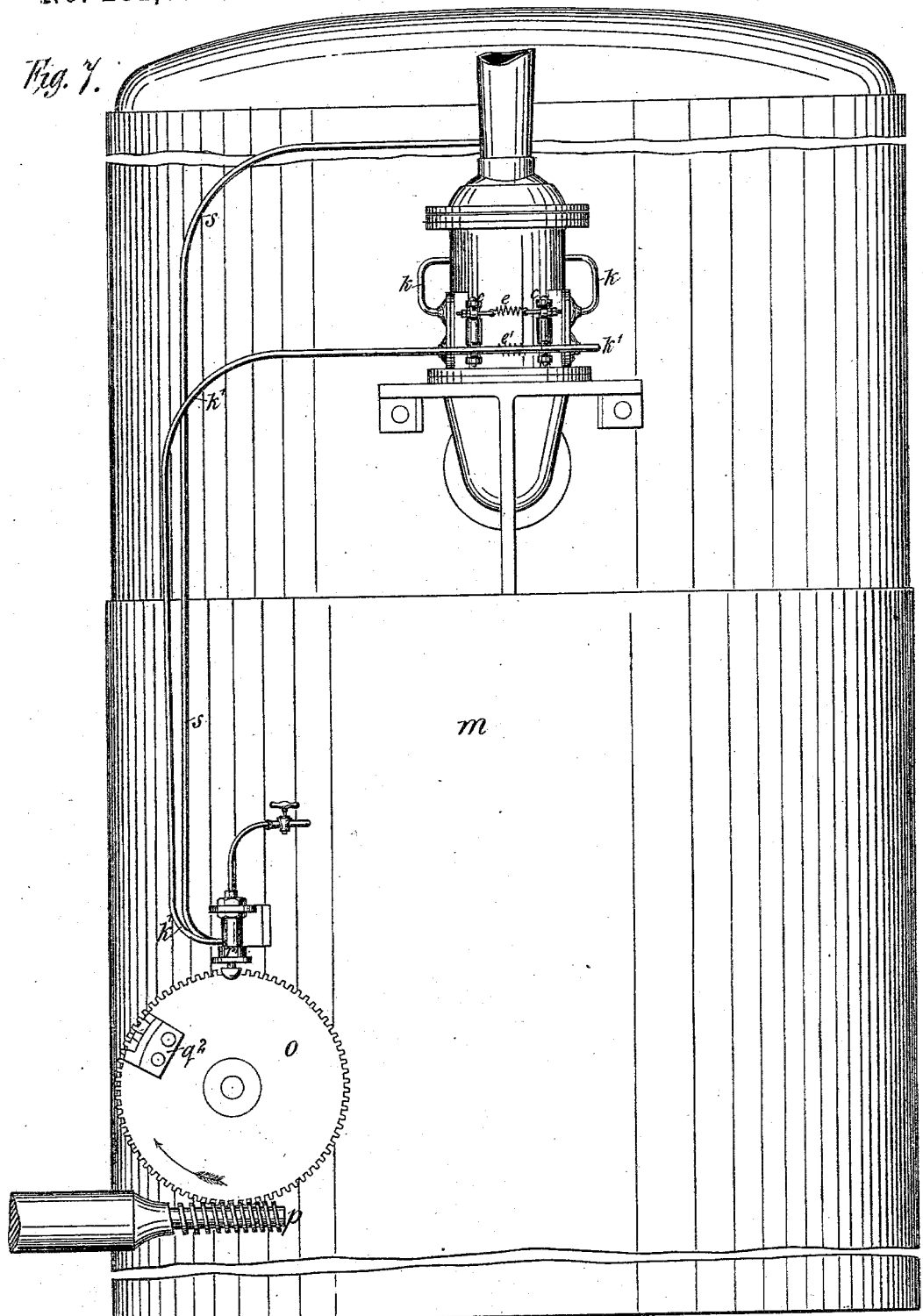

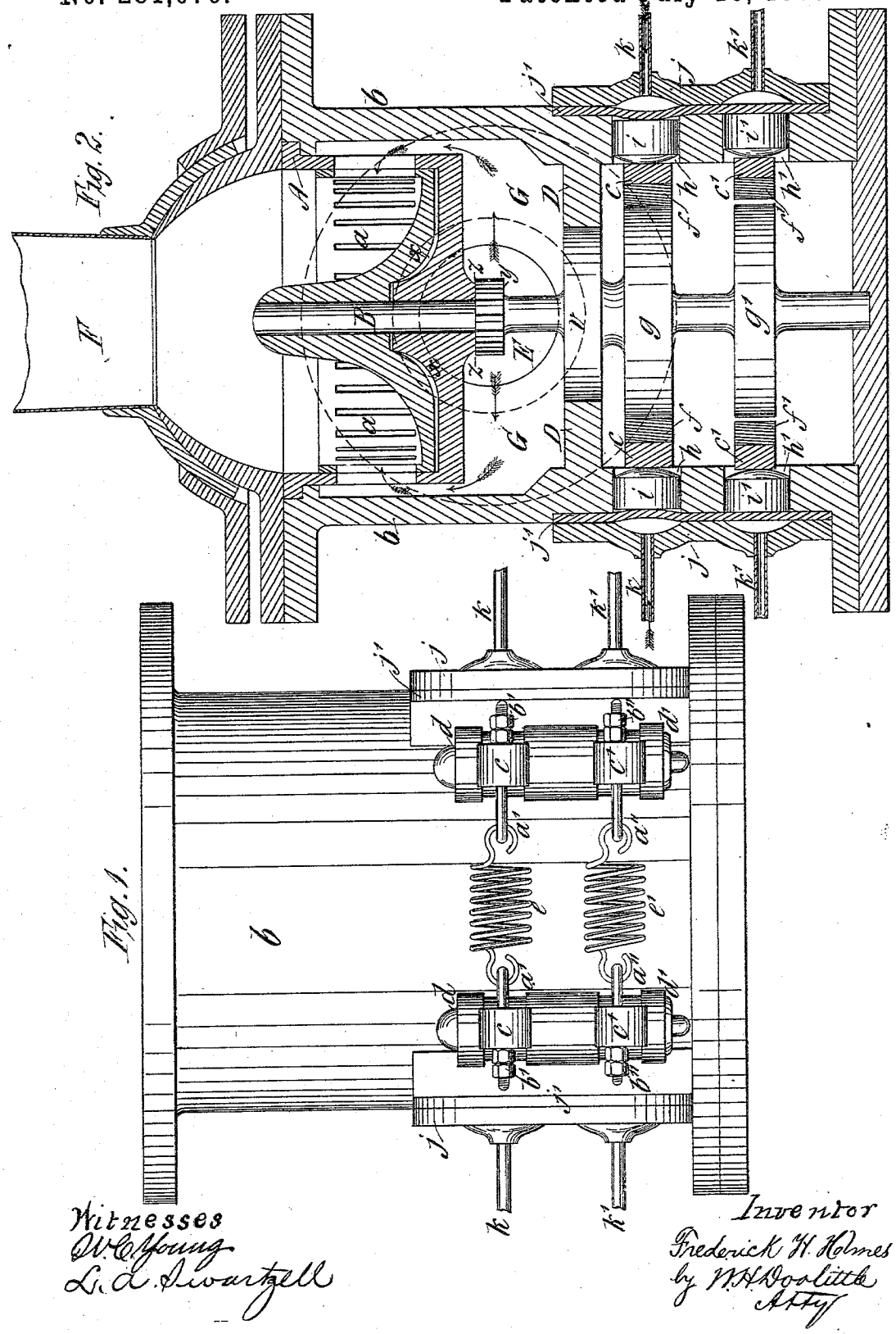

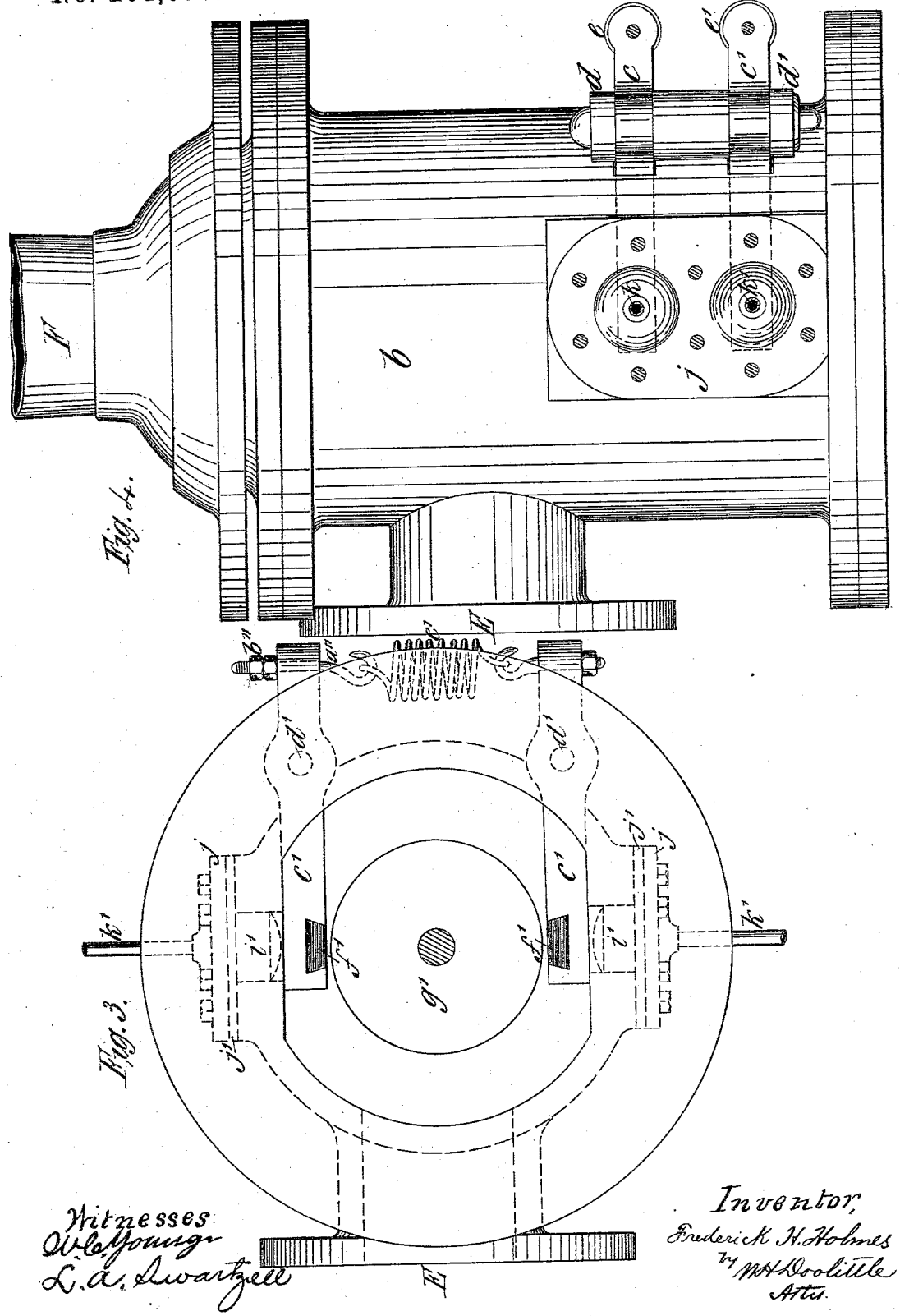

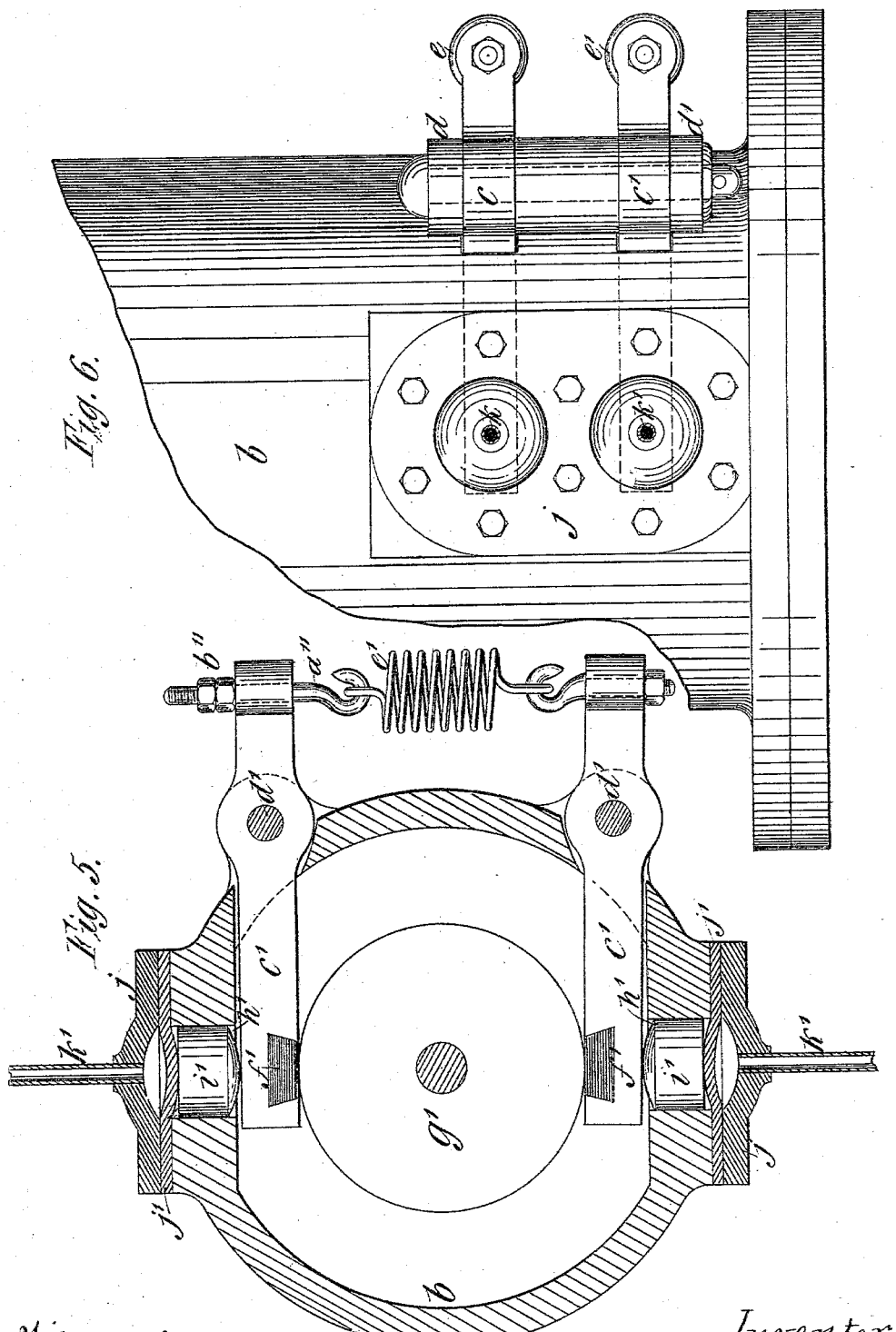

(No Model.) 6 Sheets—Sheet 4.
F. H. HOLMES.
SIREN FOR SIGNALING.
No. 281,070. Patented July 10, 1883.

Witnesses
Inventor
Frederick H. Holmes
by N. H. Doolittle, Atty.

(No Model.) 6 Sheets—Sheet 5.
F. H. HOLMES.
SIREN FOR SIGNALING.
No. 281,070. Patented July 10, 1883.
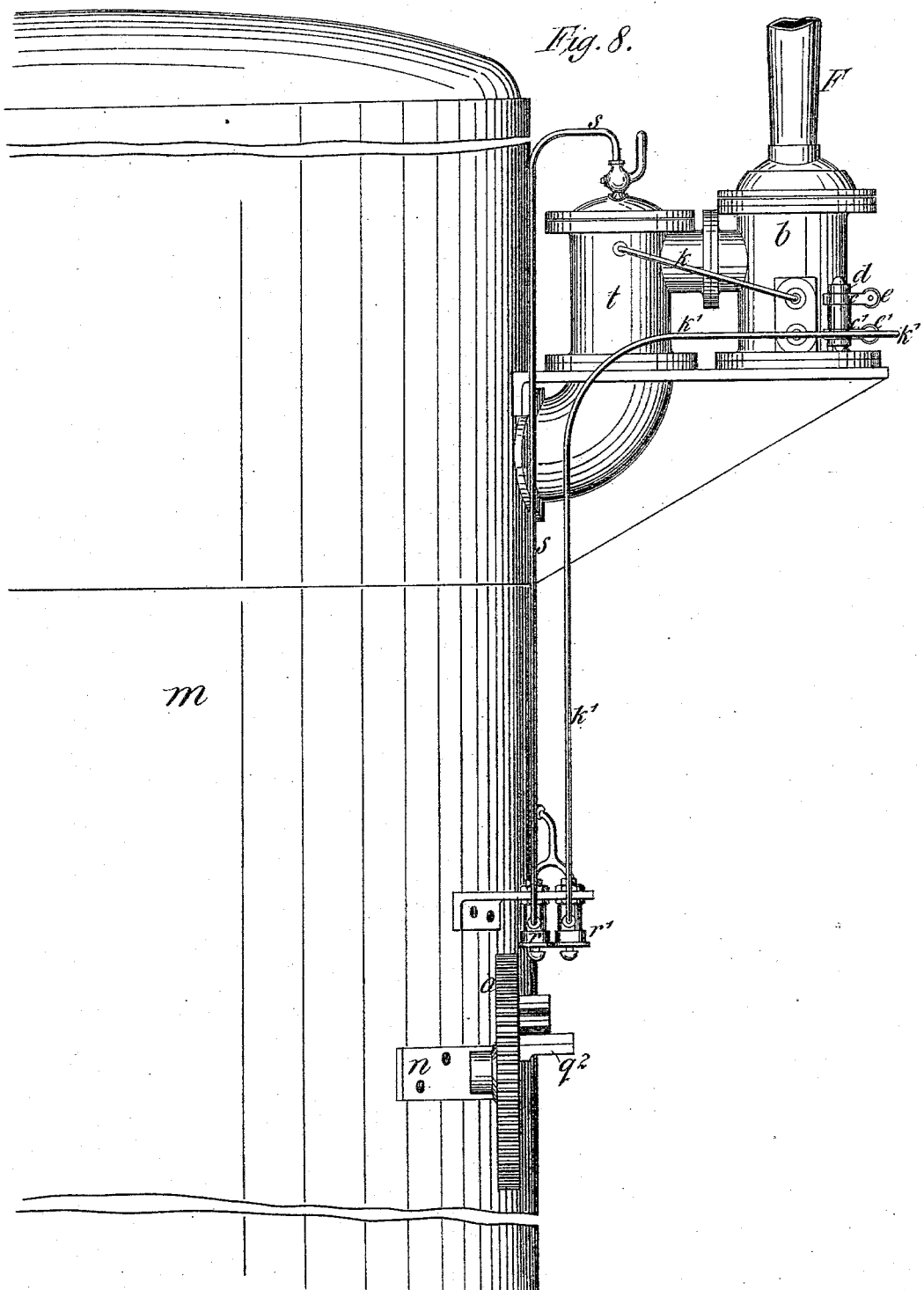
Witnesses
W. E. Young.
D. A. Swartzell.
Inventor
Frederick H. Holmes,
by W. H. Doolittle, Atty.

(No Model.) 6 Sheets—Sheet 6.

F. H. HOLMES.
SIREN FOR SIGNALING.

No. 281,070. Patented July 10, 1883.

Witnesses
W. C. Young
L. A. Swartzell

Inventor
Frederick H. Holmes
by W. H. Doolittle
Atty

UNITED STATES PATENT OFFICE.

FREDERICK H. HOLMES, OF WEST BROMPTON, COUNTY OF MIDDLESEX, ENGLAND.

SIREN FOR SIGNALING.

SPECIFICATION forming part of Letters Patent No. 281,070, dated July 10, 1883.

Application filed October 7, 1882. (No model.) Patented in England August 13, 1881, No. 3,528, and in France February 9, 1882, No. 147,282.

*To all whom it may concern:*

Be it known that I, FREDERICK HALE HOLMES, a subject of the Queen of Great Britain and Ireland, residing at West Brompton, in the county of Middlesex, Kingdom of Great Britain and Ireland, have invented new and useful Improvements in Sirens or Signaling Apparatus, (for which I have obtained a patent in Great Britain, No. 3,528, bearing date August 13, 1881, and a patent in France, No. 147,282, bearing date February 9, 1882, signed April 19, 1882,) of which the following is a specification.

This invention relates to the construction of signaling apparatus of the kind known as the "siren," and apparatus combined therewith for working it automatically.

According to my invention, I make a siren able to produce consecutively a high and one or more low notes, each differing in pitch, and in any desired order—such, for example, as high, low, high or low, low, high, and so on—as desired, automatically. For this purpose I combine with the rotary part of the siren proper two or more brakes or governors arranged in such a manner that one brake, when adjusted, will produce a definite high note by regulating the speed or number of revolutions per second of the siren; but when a second brake is made to act together with the first, the friction is increased, causing the siren to revolve with less velocity, and consequently to produce a lower note. Furthermore, in order to regulate the exact pitch of the high and low notes, I combine with said siren and brakes means whereby each brake can be adjusted to the greatest nicety to produce the required notes. One form of brake consists of two arms or levers hinged to the outer cylinder of the siren, on opposite sides, and passing through slots in the same, so as to come in contact with the surface of an inner cylinder fixed to the shaft or spindle of the siren and revolving with it. These two arms or levers are hinged onto the outer or fixed cylinder of the siren at a certain distance from one end, and the two opposite brake arms or levers are connected at these ends by an adjustable spiral or other spring, which, on being more or less tightened, lifts the two arms with more or less force from the surface of the revolving cylinders. Immediately over or close to the parts of the arms where they come in contact with the revolving cylinder I place over each arm a small cylinder with a piston, which small cylinders are fixed on the outer or fixed cylindrical part of the siren, and are air-tight. When the compressed air or steam (whichever is used) enters these two small cylinders, the pistons are pressed down on the brake arms or levers with a force according to the pressure of the air or steam by which the self-acting siren is worked. This pressure should always be in excess of that required, in order that the exact normal pressure for any given note may be obtained by adjusting the spring above mentioned, which acts against the pressure on the pistons. The pressure on the arms or levers is regulated by the size of the pistons. As the pressure acting on the siren becomes less during the sounding, the siren, which is turned by that pressure, would fall off in its velocity; but by this arrangement the pressure on the small pistons is just as much reduced, and hence the pressure on the brake is reduced in the same proportion, and in consequence the note of the siren continues constant.

In order to work these brakes automatically for light-house and light-ship apparatus, I employ small double valves acted on by cams mounted on the face of a worm-wheel making generally, say, one turn in two minutes. In the case of two different notes being required, I arrange two of the small double valves in a line parallel with the axis of the worm-wheel. The valve nearest the wheel is opened when the cam passes under it, and thus acts upon the large valve, admitting the air or steam to the siren, and also to the two small pistons acting on the high-note brake. The second small double valve sends the air to the second or low-note brake. The cams for the high note only project to a sufficient extent to reach the first double valve, while the cams for the low note project so as to act on both double valves. For instance, in the order of sounding hereinbefore mentioned in the first example, the cams would be short, long, short, and in the second example long, long, short, and so on. Whether the notes are two or three different notes, all that is necessary is one small double valve for each note, and the cams of such a degree of projection as to reach one, two, or three of these valves, as required.

The brake hereinbefore described is the one I prefer to adopt; but the same object may be effected by brakes mounted on the shaft or spindle of the siren, in the case of two notes only being required, and in this case arms will be thrown out by the centrifugal force against the inside of the fixed cylinder of the siren, with adjustable springs to regulate the friction. In this form of brake the second small double valve is employed to push forward by means of a small cylinder and piston (to which the valve admits the compressed air or steam) a clutch attached to the second brake, which, during the time of sounding the high note, had its arms kept outside the fixed cylinder by a spring, the clutch pushing forward the second brake, so that the arms thereof are within the cylinder, when by their extra friction they reduce the velocity of the siren to the lower note. The brakes may be otherwise modified in their details while retaining the same principle by which I accomplish by automatic means a change from a high to a low note, or low to high, or low to lower, or high to higher. The brakes may also be applied to a hand-siren for ships, so that the same siren may be made to give the shrill note of a powerful whistle, and also that of a deep and powerful fog-horn.

Figure 10:
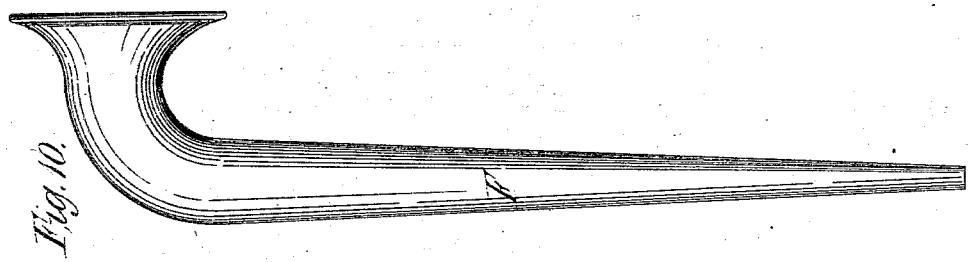
Figure 9:
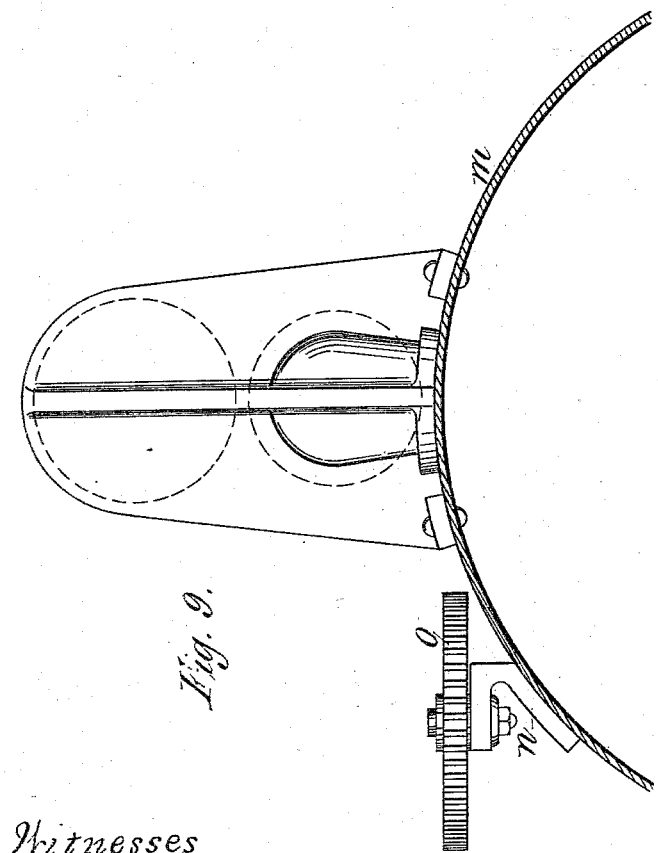
Figure 11:
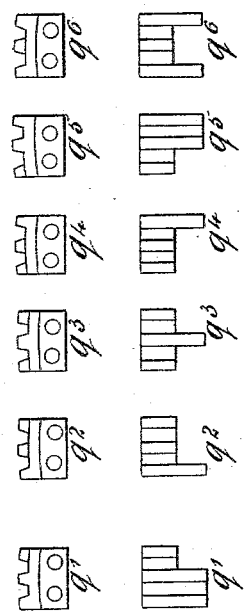

Figure 1 represents a front elevation of my improved automatic siren by which a definite high and low note can be produced in any required order; Fig. 2, a sectional view of Fig. 1; Fig. 3, an end view with the cover removed; Fig. 4, a side elevation; Fig. 5, a sectional view to an enlarged scale, showing the automatic-brake arrangement; Fig. 6, a part elevation of the same; Fig. 7, a front elevation of an air-receiver, showing the automatic siren attached thereto, together with the worm-wheel and cams and double-acting valves by which the siren is operated and the required high and low notes sounded; Fig. 8, a side elevation of the same; Fig. 9, a part plan of same, looking from the bottom; Fig. 10, an elevation of the horn; Fig. 11, a side and top view, respectively, of a set of six cams, by which the order of the sounding of the high and low notes can be varied.

According to my invention, I am enabled to cause the same siren to produce notes of any required high or low pitch, respectively, either note being capable of preceding or following the other. To accomplish this I employ two pairs of levers, $c\,c'$, pivoted, respectively, at $d$ $d'$, and connected at one of their extremities by springs $e\,e'$. These levers have bearing-surfaces $f\,f'$, formed of lignum-vitæ or other suitable material, which surfaces are normally kept from bearing upon the brake cylinders or disks $g\,g'$ by the action of the springs $e\,e'$.

Upon each side of the outside cylinder, $b$, I form two small cylindrical holes, $h\,h'$, and fit freely within each of these holes a plug or piston, $i\,i'$, the curved ends of which rest upon the levers $c\,c'$, as shown clearly in Fig. 5. The cylindrical holes $h\,h'$ are covered by a diaphragm, $j'$, of india-rubber, metal, or other material, preferably india-rubber when compressed air is employed; but when steam is used I employ metallic diaphragms, or dispense with them and cause the steam to act direct on steam-tight pistons. Over each diaphragm is attached a plate or cover, $j$, hollowed out on the under side, so as to form a space or chamber at one side of the diaphragm and piston. When compressed air or steam is admitted by the pipes $k\,k'$, (in the manner to be hereinafter explained,) the diaphragms $j'$ are depressed or forced inward, as indicated in Fig. 5, and the piston $i\,i'$ forced against the levers $c\,c'$, by which means the bearing-surfaces $f\,f'$ are pressed against the peripheries of the brake-disks $g\,g'$ and their revolution retarded, and with them the slotted cylinder $a$ of the siren. The cylinder $a$ and the brake-disks $g\,g'$ are upon one common spindle, as shown clearly in Fig. 2.

It will be seen that the action of the springs $e$ $e'$ is to resist the pressure upon the diaphragms and the pistons $i\,i'$; but the tension of the springs, and consequently the resistance, can be adjusted by means of screw-hooks $a'\,a''$ and nuts $b'\,b''$. Thus when a given high note is required the tension of the spring $e$ is adjusted until the brake-pressure allows the siren-cylinder $a$ to make the number of revolutions requisite to produce the desired note, having regard to the maximum pressure of air in the receiver. When a given low note is required in addition to the high note, the second brake is brought into operation by means of pistons $i'$, levers $c'$, and brake-disk $g'$, the spring $e'$ being adjusted (the other spring, $e$, not being interfered with) until the velocity of the revolving siren-cylinder $a$ is reduced by the combined action of both brakes to the degree necessary to produce the desired low note.

From this description it will be understood that when the first brake is applied, the high note is given, and when the second brake is used in addition to the first, the low note is sounded, so that on releasing the second brake the high note can be again sounded. It will further be seen that while the siren is being sounded the pressure of the air in the receiver will be diminishing, which would, if a uniform resistance were maintained by the brakes, cause a diminution in the speed of the revolving part of the siren, and consequently an alteration in the note; but as the air-pressure applied to the brakes comes from the same receiver as that from which the siren is supplied, the pressure on the brakes decreases in the same ratio, so that the said brakes are relieved in the same proportion, and the speed and note remain unaltered throughout the sounding of the siren.

As it is generally required that sirens, when used for signal-stations and light-ships, should sound a definite and specified note or notes, it is essential to reduce as much as possible all liability to friction, excepting that absolutely applied by the brakes. It has been found by experience that with the sirens hitherto constructed, a small quantity of the steam or compressed air insinuated itself between the surfaces of the revolving cylinder $a$ and the fixed slotted cylinder A, and created a pressure in the space $x$, between the back of the revolving cylinder $a$ and the bottom of the fixed cylinder. This pressure tends to force the cylinder $a$, and with it the spindle B, outward, causing friction between the side of the ratchet-wheel $y$ and the face of the bearing of the fixed cylinder A at $z$. To obviate this I form upon or attach to the spindle B a disk or flange, $v$, which is free to revolve within an internal flange, D, of the outer cylinder, $b$. The steam or compressed air enters through the port E (and passes in the direction shown by arrows) to the slots of the siren-cylinders, whence it escapes through the horn F, the space between the flange D and the back of the fixed cylinder A constituting an air or steam chamber, G. The diameter of the disk $v$ is such that the pressure upon its surface counteracts the effect of the pressure in the space $x$ and serves to restrain the tendency of the cylinder $a$ to be forced outward. By this means friction at $z$ is prevented and uncertainty in the note obviated.

When compressed air is used for operating the siren, I employ a vessed or receiver, $m$, as shown by Figs. 7, 8, 9, and attach thereto a suitable bracket, $n$, upon which is mounted a worm-wheel, $o$, which may be revolved by means of a screw-thread, $p$, formed on the end of the main shaft of the engine, and worm-teeth upon the periphery of the cam-wheel, as shown, or by other convenient means. This wheel is shown arranged to accomplish one complete revolution in two minutes, (but it may be otherwise arranged, as required,) and upon its side is attached one or the other of the cams $q'$ $q^2$ $q^3$ $q^4$ $q^5$ $q^6$, according to the order in which the notes of the siren are to be sounded. The apparatus is shown in the drawings with the cam $q^2$ applied, which is arranged to sound the notes in the following order, namely: first a high note, then again a high note, and then a low note.

The cams have on their faces long and short projections, as shown, which, as the wheel revolves, come into contact with one or both of the plungers of the double valves $r$ $r'$.

In the arrangement shown the operation is as follows: The cam-wheel $o$, revolving in the direction indicated by the arrows, causes the first short projection to operate the valve $r$. Thereupon the compressed air passes by pipe $s$ into the valve-box $t$ and opens the starting-valve of the siren. A small quantity of compressed air then passes from the valve-box $t$ by two pipes, $k$, and, depressing the diaphragm $j'$, operates the brake-pistons $i$ and levers $c$, as before described with reference to Figs. 1 to 6. The high note is thus sounded and continues to sound until the first short projection of the cam has passed the plunger of the valve $r$. The sound ceases during the interval between the projections, owing to the supply of air being discontinued. The other short projection, coming into contact with the valve $r$, causes a repetition of the operation, and the high note is consequently again sounded and discontinued in a similar manner. When the long projection arrives in position, it presses the plunger of the valve $r$, and likewise of another valve, $r'$. This latter valve, $r'$, allows compressed air to pass by the pipe $k'$ to the diaphragms $j$, and to depress the pistons $i'$ and the levers $c'$, (see Figs. 1 to 6, inclusive,) by which means the second brake, in addition to the first, is brought into operation, and by its additional friction reduces the velocity of the siren and causes the low note to be sounded.

It will be seen by the above description and reference to Fig. 11 that with the arrangements of cams shown, six distinct series of signal-sounds can be produced by the use of a high and a low note, according to which cam $q'$ to $q^6$ is used; hence a series of signal-stations could be placed around the coast, each capable of sending forth a separate signal by which it could be distinguished.

The following shows the order in which the stations might be arranged, each using the cam according to its number, thus: cam $q'$, high note, low note, low note; cam $q^2$, high note, high note, low note; cam $q^3$, high note, low note, high note; cam $q^4$, low note, high note, high note; cam $q^5$, low note, low note, high note; cam $q^6$, low note, high note, low note.

So far I have described the application of my invention for fog signaling from stations and light-ships, and have shown the arrangement for producing two notes; but I do not limit myself to such two notes or to the order in which they are to be sounded, for it will be obvious that more than two notes can be produced, or that the two-notes arrangement may be made to give more than three sounds as a signal without departing from the essential features of my invention. In cases where it is necessary to place the motive power and pumps for supplying the air-receiver at a considerable distance from the signaling apparatus for the automatic production of more than one note, I employ a cam-wheel having short and long projections of a similar character to those described with reference to Figs. 7, 8, 9, and 11 of the accompanying drawings, together with two or more of the double valves $r$ $r'$, before described; but instead of using separate cams to be bolted on the cam-wheel, I form the wheel itself with a series of long and short projections at or near its periphery, and (as in this case the cam-wheel, instead of completely revolving to produce a signal, only rotates, say, one-eighth of a revolution) I arrange a repetition of the short and long projections—say eight times—so as to produce the required signal in each eighth of a revolution of the wheel.

It will be obvious that by varying the amount of pressure of the brakes or increasing their number, more than two notes can be produced without in any way departing from the principle of my invention.

It will also be evident that my improved siren may be used for other than fog-signaling purposes. For instance, it may be applied for use on railways, in dock-yards, manufactories, &c., for transmitting sound-signals to a distance.

What I claim is—

1. In a siren, the combination of the siren-shaft having disks, and brake-levers arranged to press, respectively, against the said disks separately or together, substantially as and for the purpose herein specified.

2. The combination of the siren-shaft provided with disks, with opposite brake-levers held normally away from said disks by connecting-springs, and pressed against said disks by compressed-air or steam pistons, substantially as and for the purpose herein specified.

3. The combination of the siren-shaft provided with disks, opposite brake-levers provided with bearing-surfaces and held normally out of contact with said disks by adjustable springs, and steam or compressed-air supplying pipes, substantially as and for the purpose herein specified.

4. The combination of the siren-shaft provided with disks, and the sets of levers arranged and operated substantially as described, whereby when one set of levers presses against one disk a definite high note will be produced, and when, in connection with this set of levers, the pressure of a second set of levers is added to a second disk, the speed of the siren-shaft will be diminished and a definite lower note will be produced, substantially as and for the purpose herein specified.

5. The combination of a receiver and connecting-pipes communicating with the siren-case and the levers, whereby the pressures on the levers and the siren bear a constant ratio, substantially as and for the purpose herein specified.

6. In a signaling apparatus, the combination of the brake-levers controlling the action of the siren, a compressed-air or steam receiver, pipes and pistons connecting the same, valves in said pipes for controlling the admission of the compressed air or steam, and mechanism for operating said valves, substantially as and for the purpose herein specified.

7. The combination of the brake-levers controlling the action of the siren, and a cam composed of a set of projections of different lengths, arranged to give a recognizable series of high and low notes by controlling the admission of compressed air or steam into mechanism connecting said cam and brake-levers, substantially as and for the purpose herein specified.

8. The combination of brakes controlling the action of the siren, a cam composed of projections, as described, and situated upon the periphery of a revolving wheel, connecting pipes and pistons, and valves operated by said cam, substantially as and for the purpose herein specified.

9. The combination of the brakes controlling the action of the siren, a cam composed of projections, as described, and situated upon the periphery of a revolving wheel, a rotating worm-shaft for giving motion to said wheel, and connecting pipes and pistons, and valves operated by said cam, intermediate between such cam and the siren-brakes, substantially as and for the purpose herein specified.

10. In combination with the outer and inner cylinders of the siren, the counter-pressure disk upon the revolving siren-shaft fitting in ways, whereby the pressure between the siren-cylinders is counteracted, substantially as and for the purpose herein specified.

FREDERICK HALE HOLMES.

Witnesses:
G. DUPONT,
 2 *Rue de Recroy.*
EMILE PETIOT,
 19 *y der Haller.*